United States Patent [19]

Hock

[11] 4,030,476

[45] June 21, 1977

[54] HEATED CABINET FOR FOOD

[75] Inventor: Lester R. Hock, Hacienda Heights, Calif.

[73] Assignee: Bevles Co., Inc., El Monte, Calif.

[22] Filed: Mar. 5, 1976

[21] Appl. No.: 664,153

[52] U.S. Cl. ............................. 126/246; 126/268; 165/60; 219/218; 219/400; 312/236

[51] Int. Cl.² ................... A47G 23/04; F24C 15/18

[58] Field of Search ................. 126/246, 268, 261; 165/59, 60, 65; 62/418, 457, 388; 219/214, 218, 400; 174/16 R; 98/36; 312/236

[56] References Cited

UNITED STATES PATENTS

| | | | |
|---|---|---|---|
| 1,752,749 | 4/1930 | Lueck | 126/268 |
| 3,021,776 | 2/1962 | Kennedy | 98/36 X |
| 3,192,306 | 6/1965 | Skonnord | 312/236 X |
| 3,205,033 | 9/1965 | Stentz | 62/457 X |
| 3,632,968 | 1/1972 | Wilson | 219/214 |
| 3,641,945 | 2/1972 | Tillander et al. | 312/236 X |
| 3,836,220 | 9/1974 | Ishammar | 312/236 |
| 3,895,215 | 7/1975 | Gordon | 219/400 |
| 3,908,749 | 9/1975 | Williams | 165/61 X |

FOREIGN PATENTS OR APPLICATIONS 262,862   12/1926   United Kingdom ............. 126/268

Primary Examiner—Ronald C. Capossela
Attorney, Agent, or Firm—Blakely, Sokoloff, Taylor & Zafman

[57] ABSTRACT

A cabinet that maintains heated food at a constant temperature by circulating heated air including means for controlling moisture in the circulating air. A top mounted blower forces the heated air through a louvered panel over pans of food; the louvers are graduated to assure even distribution of air. A water reservoir is employed which includes baffling to prevent water from being spilled when the reservoir is moved, the baffling also permits control over the amount of moisture absorbed by the circulating air.

11 Claims, 7 Drawing Figures

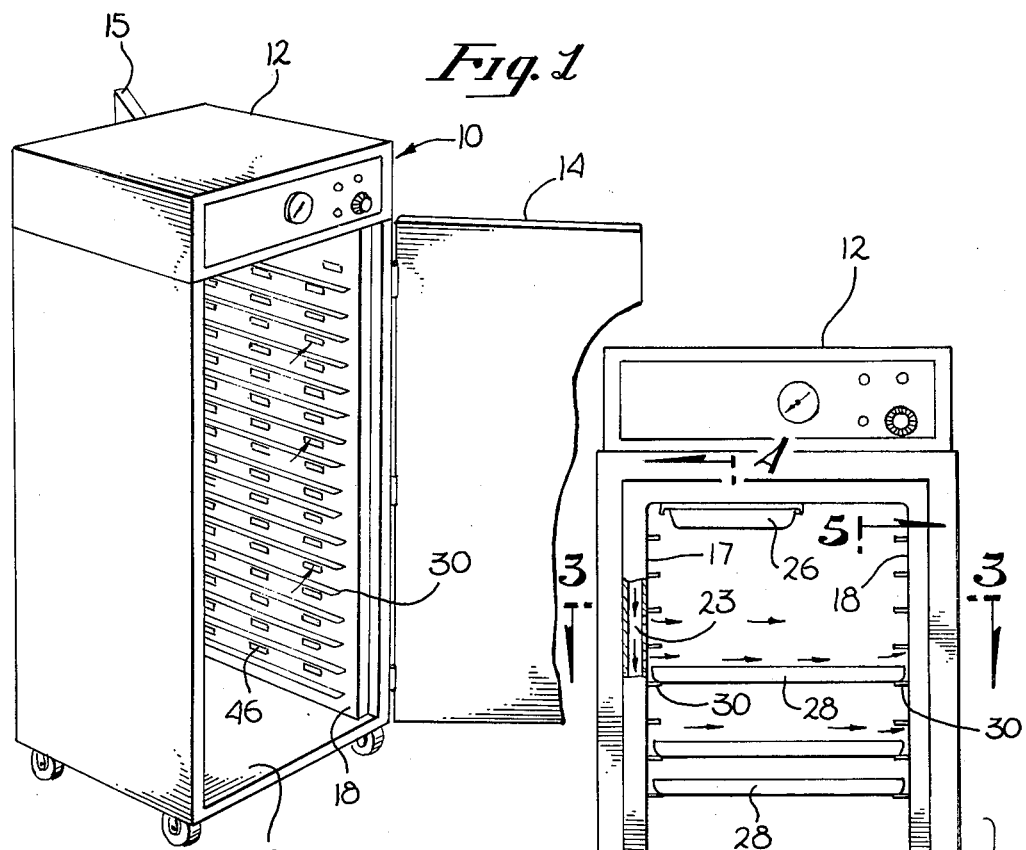
Fig. 1
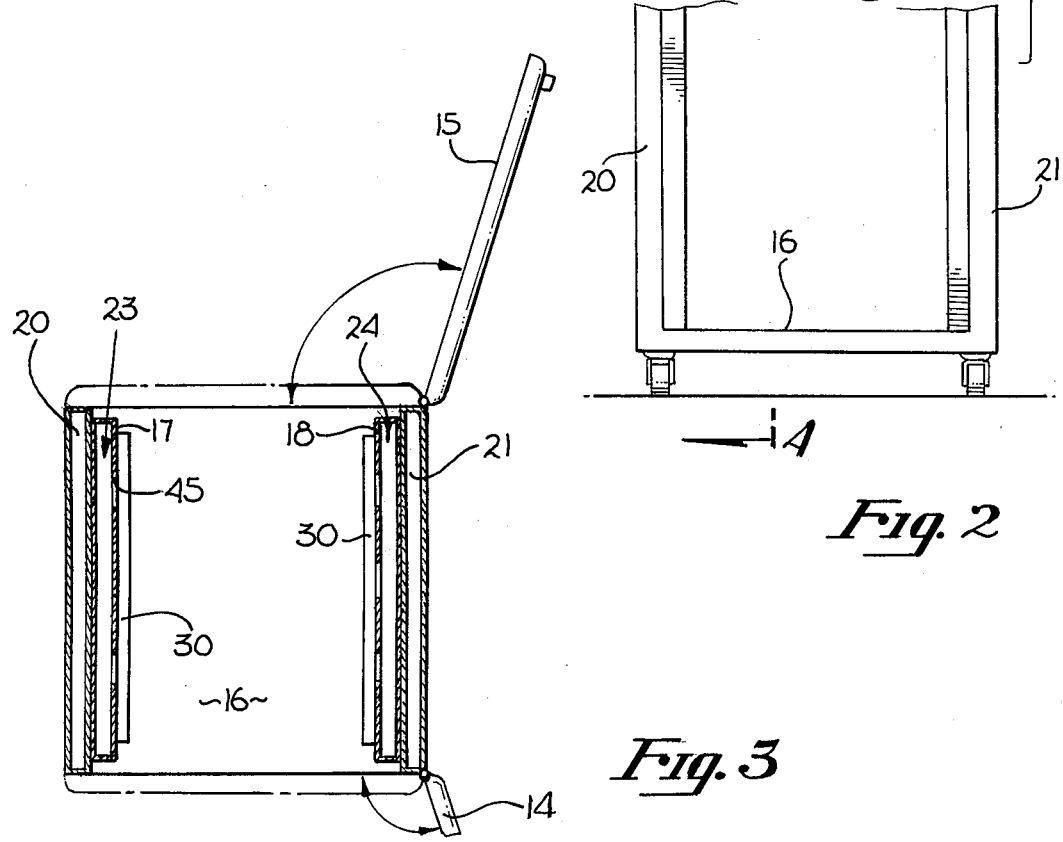
Fig. 2
Fig. 3

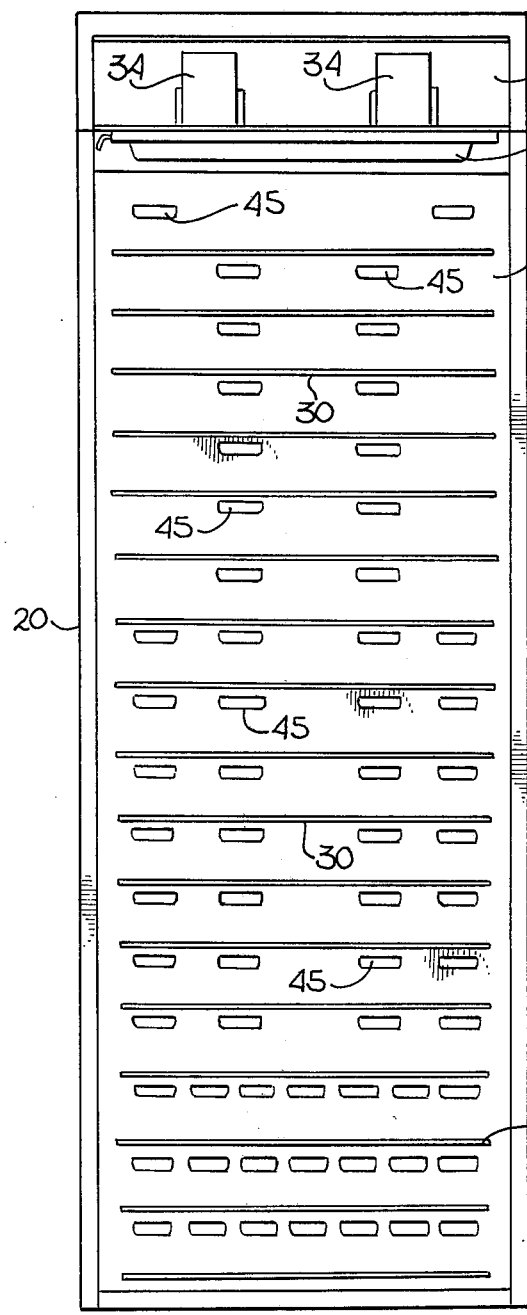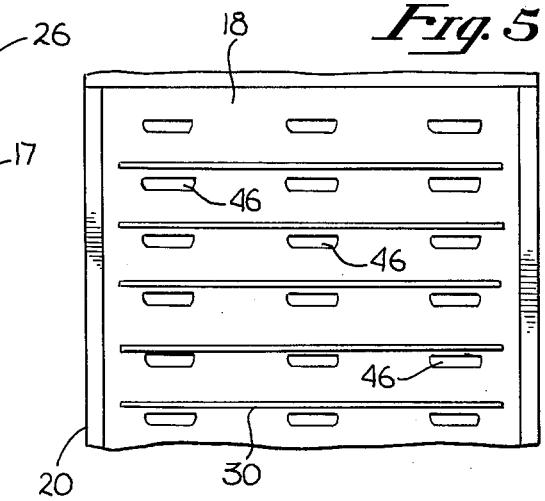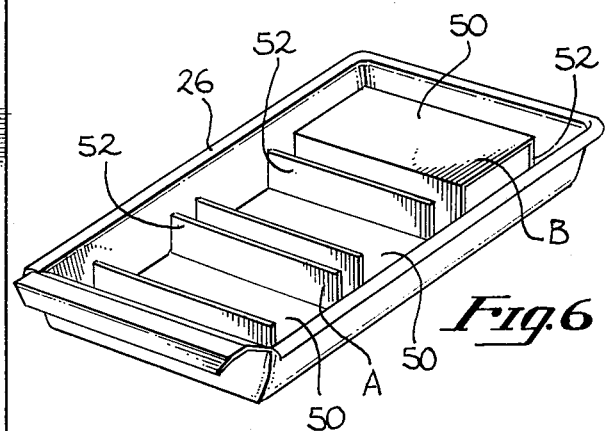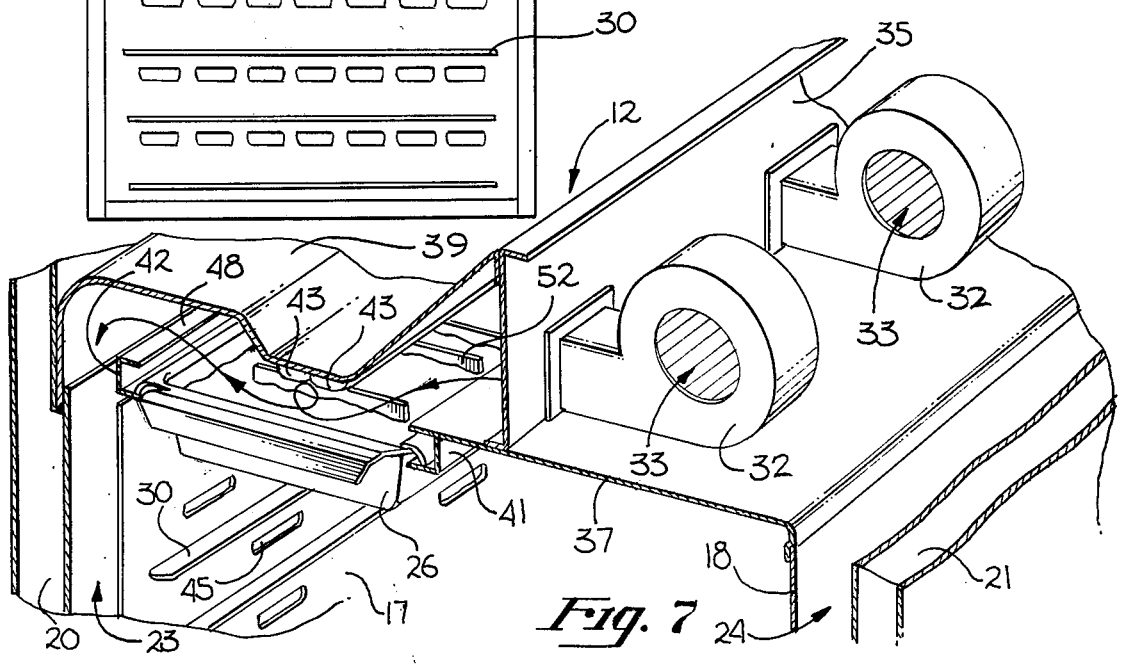

HEATED CABINET FOR FOOD

BACKGROUND OF THE INVENTION

1. Field of the Invention

The invention relates to heated cabinets for food.

2. Prior Art

Heated cabinets for maintaining food in a heated or warm condition are commonly employed in restaurants, hotels, fast-food franchises, and the like. Typically, the food is prepared or cooked in advance of its serving or sale and then stored in heated cabinets until needed. The cabinets are used to keep the food warm, and often moist, without cooking the food.

In such heater cabinets it is, of course, desirable to maintain all the food in the cabinet at a uniform temperature. Moreover, the temperature of the food in the cabinet should be constant, for example, the temperature should not be effected by the opening and closing of the cabinet door. In a typical application the cabinet door is repeatedly opened and closed, thus making it difficult to maintain the food in the cabinet at a constant, uniform temperature. In some prior art cabinets, hot air is circulated over the food towards the cabinet door. In these cabinets when the door is opened, substantial heat is lost. With the invented cabinet a side-to-side flow is employed along with graduated air outlets to assure uniform, constant temperature within the cabinet.

In some heated cabinets means are not provided for varying the amount of moisture in the cabinet. It is desirable to control the amount of moisture in the heated, circulating air since the ideal moisture level varies from food-to-food. For example, where a crisp food is to be stored, less moisture or no moisture is required, whereas for moist foods substantial amounts of moisture are required. Heated cabinets often employ water pans for adding moisture to the circulating air. These pans are filled at a sink, or the like, and then placed in the cabinet. Water is frequently spilled from these pans during this movement. With the invented cabinet, a baffle member is employed within a water pan to substantially lessen the chance of water spillage; moreover, the baffle member provides control over the amount of moisture absorbed by the circulating air.

SUMMARY OF THE INVENTION

A heated cabinet for holding food at a constant, uniform temperature is described. The cabinet includes a top mounted blower and heating element for heating air and circulating the air throughout the cabinet. A cabinet inlet plenum is defined between one side wall of the cabinet and a louvered panel. This panel includes graduated openings to assure uniform distribution of air in the cabinet. The exhaust plenum includes a louvered panel mounted spaced apart from the opposite side wall. Thus, circulating air flows from side-to-side in the cabinet. A water reservoir in the form of a water pan is mounted beneath the heating element, and a plurality of channel-shaped baffle members are disposed within this pan. The flanges of these baffle members retard the movement of water within the pan, thus preventing water from spilling when the pan is moved. The webs of these baffle members when resting on the flanges prevent circulating air from contacting the surface of the water, thereby providing drier circulating air. When the baffle members are turned-over, such that the webs are underwater, the circulating air contacts the water surface providing moist air.

BRIEF DESCRIPTION OF THE DRAWINGS

FIG. 1 is a perspective view of the heated cabinet with the main door and rear door of the cabinet opened;

FIG. 2 is an elevation view of a cabinet of FIG. 1. Note that in this view the main door of the cabinet is not illustrated;

FIG. 3 is a cross-sectional plan view of the cabinet taken through section line 3—3 of FIG. 2;

FIG. 4 is a cross-sectional elevation view of the cabinet taken through section line 4—4 of FIG. 2. This view is primarily used to illustrate the graduated louvered panel employed for distributing inlet air;

FIG. 5 is a partial cross-sectional elevation view of the cabinet taken through section line 5—5 of FIG. 2. This view is primarily used to show the exhaust louvered panel;

FIG. 6 is a perspective view of the water reservoir and baffle members employed with the cabinet; and FIG. 7 is a partial cutaway view illustrating the top mounted blowers and heating element employed in the cabinet.

DETAILED DESCRIPTION OF THE INVENTION

The invented cabinet is designed to provide a uniform temperature throughout the entire interior of the cabinet, and to provide a substantially constant temperature even when the cabinet door is repeatedly opened and closed. The cabinet also provides means for varying the moisture in the circulating, heated air.

In the presently preferred embodiment the cabinet is fabricated substantially from aluminum, however, other metals such as stainless may be employed. Commonly employed sheet metal techniques are utilized in the fabrication of the cabinet. In the presently preferred embodiment, commercially available centrifugal blowers are used, each blower is driven by an electric motor developing approximately 1/10 horsepower. A commercially available heating element consuming approximately 1,500 watts is also used. For the illustrated embodiment the cabinet is approximately 71 inches high, 24 inches wide, and 31 inches deep (outside dimensions) and accommodates 17, 18 × 26 inch pans. As will be appreciated, the specific power ratings, dimensions and number of pans of the described embodiment are not required to practice the invention, but rather are set forth to provide a better overall understanding of the cabinet.

Referring first to FIGS. 1, 2 and 3, the heated cabinet 10 includes a generally rectilinear housing defining an interior volume in which the heated food is stored. The upper and lower limits of the interior are defined by the generally rectangular base 16, and the top mounted unit 12. The sides of the cabinet are defined by the parallel side walls 20 and 21, a main door panel 14, and a rear door panel 15. The side walls, doors and base of the cabinet are fabricated in a standard manner and are insulated to inhibit the escape of heat from the cabinet.

The blowers and heating element are disposed within the top mounted unit 12. Also the controls for operating the cabinet are included as part of this top mounted unit. The details on this unit 12 shall be described in conjunction with FIG. 7. However, it should be noted that with the blowers and heating element at the top of the cabinet, food and moisture cannot fall into these members and cause smoke or shortened circuits.

Referring to FIGS. 2, 3 and 4, heated air from the top mounted 12 is forced into an inlet plenum 23 and then into the interior of the cabinet. The plenum 23 is defined by the inside surface of the side wall 20 and the louvered panel 17. The panel 17 is mounted parallel to, and spaced-apart from, the wall 20 so as to define this inlet manifold or plenum. The inlet louvered panel 17 includes a plurality of apertures or openings 45 to allow air from the plenum 23 to flow into the interior of the cabinet. In the presently preferred embodiment, the number of openings are graduated such that a greater number of openings exist at the bottom of the panel 17 as compared to the top of the panel 17. Specifically as shown in FIG. 4, two openings 45 are directed over the first seven pan supports 30, four openings 45 are directed over the next seven supports 30, and seven openings 45 are disposed over the last three supports 30. The upper most openings 45 are spaced-apart a greater distance than the next 6 rows of openings to prevent hot air from being blown against the water pan 26.

An exhaust plenum 24 is defined between the exhaust louvered panel 18 and the interior surface of the side wall 21. In the manner similar to the mounting of panel 17, panel 18 is thus mounted spaced-apart and parallel to the side wall 21 to define the plenum 24. The plenum communicates with the interior of the cabinet through a plurality of openings 46. In the presently preferred embodiment, the exhaust openings, unlike the inlet openings 45, are not graduated and three openings 46 are disposed through the panel 18 facing each row of openings on the panel 17.

A pan support 30 is mounted below each row of openings on panels 17 and 18. Supports 30 are used to support the food trays or pans, such as pans 28, illustrated in FIG. 2. The supports 30 in the presently preferred embodiment, are fabricated from extruded aluminum. While for the described embodiment the bases of the food pans are shown supported on supports 30, guides may be used to support the pans along the pan beads in the manner that pan 26 of FIG. 7 is supported.

Referring to FIG. 7 and the cutaway drawing of the top mounted unit 12, this unit includes a pair of centrifugal blowers 32 which are mounted to a blower support plate 35. The inlets 33 of the blowers 32 communicate with the exhaust plenum 24 such that air from the plenum 23 may be drawn into the blowers and forced out of the outlets 34 (FIG. 4). The outlets 34 of blowers 32 communicates with a volume defined by the upper surface of the water pan 26 and the lower surface of member 39. This volume communicates with the inlet plenum 23. As is illustrated in FIG. 7, the upper surface of the cabinet interior (the lower surface of the top mounted unit 12) includes a plate 37 which extends from the louvered panel 18 to a channel 41, and a pan 26 which is disposed between the channel 41 and a channel 42. The channels 41 and 42 are spaced-apart to cooperatively receive the water pan 26. A heating element 43 is coupled to the lower surface of member 39 facing the pan 26. Sufficient clearance exists between the heating element 43 and the pan 26 to allow the pan to be easily removed from the cabinet by sliding it along the channels 41 and 42.

Referring to FIGS. 2 and 7 the flow path for the heated circulating air within the cabinet may be seen. Air entering the inlets 33 of the blowers 32 is forced from the outlets 34 over the pan 26. This is shown graphically by arrow 48 of FIG. 7. The member 39 is shaped to reduce the flow path cross-section over the pan 26 as may be seen in FIG. 7. The heating element 43 is mounted above the water pan 26 at this reduced area. This reduced cross-section assures that air contacts the heating element and water surface, thereby being heated and absorbing moisture. The air then flows into the plenum 23 and into the cabinet interior through the openings 45, across the food pans 28 and into the openings 46 of panel 18. From there the air flows upwards within the exhaust plenum 24 into the inlets 33 of the blowers 32.

The graduated openings 45 of the panel 17 assure that approximately the same volume of air flows across each of the food pans 28. Since the pressure in the plenum 23 decreases along the length of the plenum, a greater number of openings 45 are employed at the lower end of the plenum, as best illustrated in FIG. 4. It should be noted that while in the presently preferred embodiment, a plurality of openings 45 all having the same dimensions are employed, the same results could be achieved by varying the size of the openings 45 as opposed to the number of openings. As is best illustrated in FIG. 2, the flow pattern for the circulating air within the cabinet is from side-to-side, thus the flow is not severly effected by the opening and closing of the cabinet doors as with some prior art cabinets. In the presently preferred embodiment, an electrical thermostat is coupled to the heating element 43 to control the temperature of the circulating air; this thermostat is coupled to a control knob on the front panel of the top mounted unit 12.

Referring to FIG. 6 the water reservoir employed in the heated cabinet in the presently preferred embodiment comprises a pan 26. A plurality of baffle members 50 are placed within the pan 26 to retard spillage from the pan when the pan is moved and also to control the amount of moisture absorbed by the circulating air. Each of these baffle members 50 comprise a generally U-shaped, channel member having a pair of spaced-apart legs or flanges 52. A generally rectangular web interconnects each of these flanges 52. These baffle members may be placed in the pan in one of two positions; one such position is shown as position A wherein the web of the baffle member rests on the bottom of the pan. In the other position B, the web is suspended above the bottom of the pan on the flanges 52. In either position A or B the flanges 52 extend vertically upwards from the base of the pan and thereby act as baffles to prevent the rapid movement of water in the pan. Thus, when the pan is filled with water, preferably below the top of flanges 52, these flanges retard the movement of water and prevents water from spilling from the pan when the pan is being placed within the cabinet. When a baffle member is in position B its web is disposed above the surface of the water and prevents the circulating air from contacting the water below it. In this manner the air is prevented from absorbing moisture from the pan. On the other hand, if a baffle member is in position A the web will be underwater and circulating air will be able to contact the water, thereby absorbing moisture as is graphically shown in FIG. 7 by arrow 48.

In operation water is placed within the pan 26 and the pan 26 is placed beneath the heater element 43 on the channels 41 and 42 (within the cabinet interior). Depending upon the amount moisture required for the food in the cabinet, the baffle members are placed either all in position A or B, or some combination thereof. The blowers 32 and heating element 43 are then activated by known control means, and mentioned, the temperature within the cabinet may be controlled with a thermostat. Food, of course, may be readily placed within the cabinet on trays or pans, such as pans 28 illustrated in FIG. 2. In the presently preferred embodiment, the cabinet includes a main door 14 and a rear door 15 to provide access from both the front and rear of the cabinet. This is particularly useful where the food preparation occurs on one side of the cabinet and the food is sold, or otherwise distributed, from the other side of the cabinet.

Thus, a heated cabinet for food has been disclosed which maintains food at a constant temperature, which temperature is substantially uniform throughout the entire cabinet and wherein the moisture in the cabinet may be readily controlled.

I claim:
1. A cabinet for holding heated food comprising:
    a housing defining an interior;
    blower means for circulating air within said interior, coupled to said housing;
    heater means coupled to said housing for heating said circulating air; and
    closed air distribution means, for directing heated air from said blower means past food in said interior, said distribution means including at least one inlet plenum communicating with said blower means and having a plurality of graduated openings for distributing heated air into said interior, said openings being graduated such that the area defined by said openings increases with increased distance from said blower means;
    whereby an even distribution of heated air throughout said interior of said cabinet is achieved assuring that all the food in said cabinet is maintained uniformly heated.

2. The cabinet defined by claim 1 wherein said housing includes a pair of parallel, spaced-apart side walls interconnected by a door panel.

3. The cabinet defined by claim 2 wherein said inlet plenum is disposed on one of said side walls, and wherein an exhaust plenum for removing air from an interior and communicating with the input of said blower means is disposed on the other of said side walls, such that air flows from side-to-side in said interior of said cabinet.

4. The cabinet defined by claim 3 wherein said air distribution means comprises a first louvered panel spaced-apart from said one side wall so as to define said inlet plenum, and wherein said exhaust plenum includes a second louvered panel spaced apart from said other side wall.

5. The cabinet defined by claim 4 wherein said first and second louvered panels include support means extending into said interior for supporting food pans.

6. The cabinet defined by claim 1 wherein said heater means and blower means are mounted on the top of said housing.

7. The cabinet defined by claim 6 including a water reservoir disposed adjacent to the path of said circulating air to permit moisture to be added to said air.

8. A cabinet for holding heated food comprising:
    a housing defining an interior;
    blower means for circulating air within said interior coupled to said housing;
    heater means coupled to said housing for heating said circulating air;
    air distribution means for directing heated air from said blower means past food in said interior;
    a water reservoir removably mounted along the path of said circulating air for allowing moisture to be added to said air; and,
    at least one baffle member disposed within said water reservoir to vary the area of said water surface in contact with said circulating air, said baffle member including generally vertical legs for retarding movement of water within said reservoir, and a member coupled to said legs for covering the water surface in said reservoir when in a first position, and for allowing said water surface to contact said circulating air when in a second position;
    whereby the amount of moisture in said circulating air may be varied by positioning said baffle member within said reservoir.

9. A cabinet for holding heated food comprising:
    a housing defining an interior;
    blower means for circulating air within said interior, coupled to said housing;
    heater means coupled to said housing for heating said circulating air;
    air distribution means for directing heated air from said blower means past food in said interior;
    a water reservoir removably mounted along the path of said circulating air for allowing moisture to be added to said air;
    at least one channel shaped baffle member disposed within said water reservoir, said baffle member including generally vertical flanges for retarding movement of water within said reservoir, and web coupled to said flanges and supported above the water surface by said flanges for covering said water surface in said reservoir when in a first position, and for allowing said water surface to contact said circulating air when in a second position;
    whereby the amount of moisture in said circulating air may be varied by positioning said baffle member within said reservoir.

10. The cabinet defined by claim 9 wherein said air distribution means includes a plurality of graduated openings for distributing heated air into said interior, said opening being graduated such that said openings increase with increased distance from said blower means.

11. The cabinet defined by claim 9 wherein said blower means and heater means are mounted on the top of said housing.

* * * * *

UNITED STATES PATENT AND TRADEMARK OFFICE
CERTIFICATE OF CORRECTION

PATENT NO. : 4,030,476
DATED : June 21, 1977
INVENTOR(S) : Lester R. Hock

It is certified that error appears in the above-identified patent and that said Letters Patent are hereby corrected as shown below:

Column 2, Line 36: after "stainless" insert --steel--.

Column 4, Line 68: after "amount" insert --of--.

Column 5, Line 4: delete "and mentioned" and insert --as mentioned--.

Column 5, Line 48: at the end of the line, delete "an" and insert --said--.

Signed and Sealed this

Sixth Day of December 1977

[SEAL]

Attest:

RUTH C. MASON
*Attesting Officer*

LUTRELLE F. PARKER
*Acting Commissioner of Patents and Trademarks*